United States Patent [19]

Ishizaka et al.

[11] 4,311,737

[45] Jan. 19, 1982

[54] ADHESIVE SILICONE COMPOSITIONS FOR SUBSTRATES

[75] Inventors: Mitsuo Ishizaka, Ohta; Heiji Sumida, Menuma, both of Japan

[73] Assignee: General Electric Company, Waterford, N.Y.

[21] Appl. No.: 941,992

[22] Filed: Sep. 13, 1978

[30] Foreign Application Priority Data

Sep. 14, 1977 [JP] Japan .................................. 52-110828

[51] Int. Cl.$^3$ ................................................ B05D 3/02
[52] U.S. Cl. ..................................... 427/386; 156/329; 260/29.2 M; 260/32.8 SB; 260/33.4 SB; 260/33.6 SB; 260/33.8 SB; 427/387; 427/391; 427/393.5; 528/33; 528/34; 528/38
[58] Field of Search ................ 156/329, 330; 427/387, 427/207 A, 207 B, 386, 391, 393.5, 207.1; 528/33, 34, 38; 260/348.41, 29.2 M, 29.2 EP, 33.6 SB, 33.6 EP

[56] References Cited

U.S. PATENT DOCUMENTS

| | | | |
|---|---|---|---|
| 3,547,766 | 12/1970 | Chu | 156/329 X |
| 3,980,599 | 9/1976 | Kondo et al. | 260/29.2 M |
| 4,032,487 | 6/1977 | Columbus | 156/329 X |
| 4,046,930 | 9/1977 | Johnson et al. | 427/387 |
| 4,101,272 | 7/1978 | Guise et al. | 427/387 X |
| 4,122,127 | 10/1978 | Mikami et al. | 156/329 X |

FOREIGN PATENT DOCUMENTS 952995  3/1964  United Kingdom ................ 156/329

*Primary Examiner*—Norman Morgenstern
*Assistant Examiner*—Thurman K. Page

[57] ABSTRACT

Adhesive silicone composition with good adherence to various substrates comprising a silicone mixture selected from the class consisting of a mixture of a polysiloxane having glycydoxy or epoxycyclohexyl groups in combination with an amine functional silane or siloxane. These compositions provide good water resistant shelf-adhering coatings to plastics, paper and rubber.

21 Claims, No Drawings

ADHESIVE SILICONE COMPOSITIONS FOR SUBSTRATES

BACKGROUND OF THE INVENTION

This application claims priority over Japanese Patent Application Ser. No. 110828/77 filed Sept. 14, 1977.

This invention relates to a surface treatment method whereby the surfaces of substrates such as paper, rubber, plastic and metal are treated and given nonadhesive properties, water repellency and wear resistance. Moreover, through the surface treatment of this invention, it is possible to improve the adhesive properties of substrates when coupling other polysiloxane compositions onto them. Various polyorganosiloxane compositions have been used up to now in the treatment of substrate surfaces in order to make them nonadhesive. Classified roughly, they are (1) a solution made by adding a Si-H bond containing polyorganosiloxane and/or an organoalkoxysilane to a polydiorganosiloxane having a hydroxyl group as a terminal group and by further combining this with an organic tin compound and organic solvent; (2) a water emulsion made by adding a Si-H bond containing polyorganosiloxane and/or organoalkoxysilane to a polydiorganosiloxane having a hydroxyl group as a terminal group and emulsifying this by adding polyvinylalcohol, etc., and (3) a composition made up of a polyorganosiloxane having 2 or more vinyl groups in its molecule, a polyorganosiloxane with Si—H bonds, platinum or each component of a platinum compound and organic solvent, and/or hardening inhibitor. These compositions are excellent in the sense that they provide non-tacky coatings on substrate surfaces, but when rubber or plastics are used as the substrate, there is a disadvantage in that the hardened silicone layer falls off easily from the substrate. Also, when natural rubber, ordinary synthetic rubber, or soft polyvinyl chloride are the substrate in the composition in (3), the vulcanizing agent, vulcanization accelerator, or plasticizer in these substrates often affect the activity of the platinum or the platinum compound in the composition thereby inhibiting the hardening of the composition. This invention eliminates the foregoing disadvantage and offers a treatment method that enables one to provide rubber and plastic surfaces, in particular, with excellent nonadhesiveness, water repellency, and abrasion resistance.

SUMMARY OF THE INVENTION

This invention relates to a surface treatment method characterized by the treatment of a substrate with a surface treatment agent the principal ingredients of which are hardening substances selected from the group composed of (A) A mixture of (1) a polyorganosiloxane of the general formula

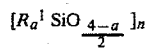

where $R^1$ denotes a monovalent radical that can be selected from a hydrogen atom and a monovalent hydrocarbon radical which is substituted or nonsubstituted such that out of all the $R^1$'s in a single molecule, at least 2 are monovalent hydrocarbon radicals that have been displaced by a glycydoxy group and/or an epoxycyclohexyl group, and the letter a is a number between 1 and 3, and n denotes a number of from 10 to 5,000; and (2) A silane and/or a siloxane having a substituted or nonsubstituted amino group which is bonded to the silicon atom via at least 1 carbon atom and an alkoxy radical bonded to the silicon atom, combined so that the number of amino groups in (2) as against 1 glycydoxy and/or epoxycyclohexyl group in (1) will vary between 0.1 to 10, and (B) the reaction product of the polyorganosiloxane mentioned above in (1) and the silane and/or siloxane in (2) and mixtures of (A) and (B).

DESCRIPTION OF THE PREFERRED EMBODIMENT

The polyorganosiloxane in (1) used in this invention contains in each molecule at least 2 hydrocarbon groups which are substituted by glycydoxy groups and/or epoxycyclohexyl groups. Examples of $R^1$ other than these epoxidized hydrocarbon groups are alkyls like the hydrogen atom, methyl group, ethyl group, propyl group and butyl group; alkenyls like the vinyl group and allyl group; aryls like the phenyl group; aralkyls like the styrenyl group; and those in which a part of the hydrogen atoms in the hydrocarbon groups are substituted by a halogen atom, nitrile group, etc. The degree of polymerization of the polyorganosiloxane is chosen from a range of from 10 to 5,000—preferably from 50 to 1,000—because of the ease of synthesis, because it is a range in which the viscosity of the composition prior to hardening does not interfere with operations, and because of the mechanical properties of the coating after hardening has taken place. If the polymerization degree is lower than this, satisfactory mechanical properties cannot be obtained, and if it is higher, it is not only difficult to synthesize, but the viscosity increases, making it hard to handle.

The silane and/or siloxane in (2) used in this invention is either an alkoxysilane with a substituted or nonsubstituted amino group that is bonded to the silicon atom via at least 1 carbon atom and a siloxane derived from that partial condensation or a polysiloxane derived from the equilibrating reaction of the said alkoxysilane and cyclic polyorganosiloxane. Some examples of the substituted or nonsubstituted amino groups that are bonded to the silicon atom by at least 1 carbon atom are the aminomethyl group, β-aminoethyl group, γ-aminopropyl group, δ-aminobutyl group, γ-(methylamino) propyl group, γ-(ethylamino)propyl group, γ-(β-aminoethylamino) propyl group, and salts in which a part or all of these amino groups have been quaternary-ammonated. For stability during storage, it is desirable, as with the γ-aminopropyl group, for example, that the amino group be bonded to the silicon atom by at least 3 carbon atoms. The said silane and/or siloxane have at least 1 radical containing such a substituted or nonsubstituted amino group in each molecule, and, further, in order to increase adhesion to the substrate, they have an alkoxy group bonded to the silicon atom. As examples of the alkoxy group can be cited the methoxy group, ethoxy group, propoxy group, and butoxy group, among others, but for ease of synthesis, the methoxy and ethoxy groups are generally favored. In order to obtain good adhesion with this alkoxy group, it is desirable that there be at least 2 per molecule. As for the added quantity of silane and/or siloxane in (2), the number of amino groups bonded to the silicon atom via at least 1 carbon atom in (2) is selected in the range of from 0.1 to 10—preferably from 0.7 to 1.5—as against a total of 1 aggregate of a glycydoxy group and epoxycyclohexyl group within the polyorganosiloxane in (1). If the number of the said amino group is below this range, the hardening properties and adhesion to the substrate are unsatisfactory. If there are too many amino groups, the hardening properties are inferior, and provide a poorer mechanical properties after hardening.

In this invention, (1) and (2) are used by forming composition (A), but (B), which is a reaction product of (1) and (2), may also be used; one may also use (A) or its components (1) or (2) in a form in which it is intermixed with (B). The (B) used here, however, must not be completely hardened but be in a state where the amino group in (2) has reacted to a part of the epoxy group in (1).

The surface treatment agent of this invention has (A) or (B), mentioned above, as its principal components; (A) or (B) may be used by themselves, or they may be diluted by organic solvents or be emulsified with water by using an appropriate emulsifier. Examples of solvents are n-heptane, petroleum hydrocarbons, toluene, xylene, isopropyl alcohol, butyl alcohol, 1, 1, 1-trichloroethane, and trichloroethylene, among others.

The treatment method of this invention is as follows:

Components (1) and (2) mentioned above are mixed in order to obtain composition (A). One may form (B) by promoting their reaction through heat stirring, but such an operation is not expressly required. Moreover, as stated above, it can be diluted with a solvent or be emulsified with an emulsifier and water. The surface treatment agent obtained thus is applied to the surfaces of various substrates like rubber and plastics by such methods as dip coating, spray coating, brush application, knife coating, and roll coating. In cases where solvents or water are used, they are removed by drying. Subsequently, they are hardened by leaving them at room temperature for a few hours or by heating them a little, depending on the substrate. Recommended heating conditions are 10 to 30 seconds at 120° to 180° C. when the substrate is paper, 1 to 5 minutes at 150° to 180° C. for rubber and 30 seconds to 2 minutes at 70° to 150° C. for plastics.

The surface treatment method of this invention, when compared with conventional treatment methods using silicone compositions, gives substrates a hardened coating with excellent adhesion. In particular, it provides rubber and plastics, for which satisfactory adhesion could not be provided by conventional silicone compositions for forming nonadhesive coatings, with a hardened coating with superior adhesion. Because the method of this invention allows treatment to take place at relatively low temperatures, treatment is possible for substrates with low heat resistance and for substrates that do not lend themselves to heat treatment because of their large size; it exhibits good nonadhesiveness and water repellency toward other substances and provides a hardened coating with excellent abrasion resistance. Further, the hardened coating obtained in this manner can be used as a primer for enabling adhering a silicone rubber or a silicone composition curable to a rubber-like substance. The treatment method of this invention can be used for the formation of a non-tacky, water repellent coating for a variety of substances, including rubber and plastics, and for the priming for silicone rubber.

The following is an explanation of this invention through the use of examples. Parts denote parts by weight in all of the examples. The examples are intended to be exemplary only and are not intended to place any limitations on the invention.

EXAMPLE 1

When 100 parts of a polyorganosiloxane of the average formula

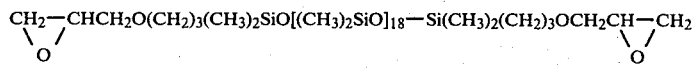

4 parts of a γ-aminopropyltriethoxysilane, and 196 parts of a trichloroethylene were mixed to dissolve them uniformly, spray coated on the surface of chloroprene rubber, and left at room temperature for 24 hours to volatilize the trichloroethylene and to harden the coating, a strong, non-tacky coating that adhered closely to the chloroprene surface was obtained.

Comparative Example 1 (a)

One hundred parts of an α, ω-dihydroxypolydimethylsiloxane of the average formula $HO[(CH_3)_2SiO]_{4000}H$ were dissolved in 200 parts of toluene and uniformly mixed after adding 3.5 parts polymethylhydrogensiloxane of the general formula $(CH_3)_3SiO[(CH_3)HSiO]_{50}Si(CH_3)_3$, 6 parts di-n-butyltindilaurate, and 2 parts γ-aminopropyltriethoxysilane; this was further diluted with toluene to prepare a 5% polysiloxane solution. When this was spray coated on the surface of chloroprene rubber and hardened for 5 minutes at 150° C. after volatilizing the solvent, a nonadhesive coating was obtained. But when it was rubbed with the hand, it easily came off the surface of the chloroprene rubber.

Comparative Example 1 (b)

One hundred parts polymethylvinylsiloxane raw rubber of the average formula $CH_2=CH(CH_3)_2SiO[(CH_3)_2SiO]_{5000}[(CH_3)(CH_2=CH)SiO]_5$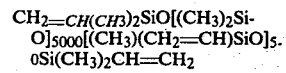$OSi(CH_3)_2CH=CH_2$ were dissolved in 300 parts toluene and uniformly mixed after adding 4 parts polymethylhydrogensiloxane of the general formula $(CH_3)_3SiO[(CH_3)HSiO]_5OSi(CH_3)_3$ and 5 parts octanol solution containing 2% chlorophatinic acid; this was further diluted with toluene to prepare a 5% polysiloxane solution. It was used to treat chloroprene rubber in the same manner as Comparative Example 1 (a), but it did not harden.

EXAMPLE 2

A mixed solution of 20 parts of γ-aminopropyltriethoxysilane and 40 parts ethanol were heated for 3 hours under the reflux of the ethanol to obtain an ethanol solution of a partial condensation product with a mean degree of polymerization of 3.5. Sixty parts of an n-heptane and 100 parts of a polyorganosiloxane of the average formula

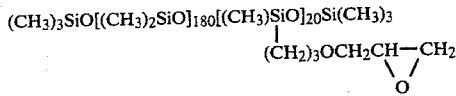

were added to this and mixed uniformly to obtain a surface treatment agent. This surface treatment agent was applied to the surface of a soft polyvinyl chloride film with a roll coater, and the solvent was removed by 2 minutes of drying at room temperature. Over this was applied by roll coater a composition that can harden like rubber that consisted of 100 parts of an $\alpha,\omega$-dihydroxypolydimethylsiloxane of the average formula $HO[(CH_3)_2SiO]_{440}H$, 10 parts of an ethyl silicate, and 5 parts of dibutyltindioctoate, which was dissolved in toluene to make a 10% solution. When the solvent was volatilized and heating took place for 5 minutes at 60° C., it yielded a hardened, rubber-like coating with excellent releasing properties. This coating had good adhesion with the polyvinyl chloride film and did not come off easily when rubbed. After applying to the surface of the coating thus obtained Scotch Tape #3 (brand name of 3M Co.) at 70° C. under the pressure of 20g/cm² for 20 hours, the exfoliation force was measured at the speed of 30cm/min. Table 1 shows a comparison of the strength of the coating and exfoliation force made between a case in which a toluene solution of the above-mentioned composition that can be cured to be a rubber-like substance is hardened in the same way without such a surface treatment agent (comparative example 2 (a)) and an untreated soft polyvinyl chloride surface (comparative example 2 (b)).

TABLE I

| | Example 2 | Compara. Example 2a | Compara. Example 2b |
|---|---|---|---|
| Strength of Coating (rubbed with fingertip) | Normal | Rubber-like coating comes off substrate | |
| Exfoliation force (g/25mm) | 10 | 10 | Does not peel off |

EXAMPLE 3

When the surface treatment agent obtained in Example 2 was applied with a roll coater to the surface of kraft paper and heat treated for 30 seconds at 150° C. after air-drying it, a strong coating, which was hard to peel and had an excellent non-tackiness, was formed.

Furthermore, a toluene solution of a composition that can harden like rubber, which was the same as that used in Example 2, was applied to this coating and hardened in the same manner as in Example 2. When the exfoliation force of this surface was measured in the same way as in Example 2, a value of 15g/25 mm was obtained.

EXAMPLE 4

A surface treatment agent was obtained in the same manner as in Example 2, except that 200 parts of a polyorganosiloxane of the average formula

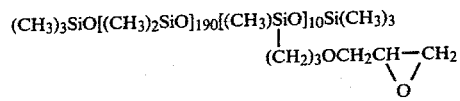

was used. This was used to treat the surface of a soft polyvinyl chloride film as in Example 2. In this example, however, the properties of the coating were tested as in Example 2 in regard to the coating of the surface treatment agent without applying a composition that is cured to a rubber-like substance. When this coating was rubbed, it neither came off nor was anything unusual noted, and the exfoliation force was 90g/25mm.

EXAMPLE 5

When a solution consisting of 100 parts of a polyorganosiloxane of the average formula

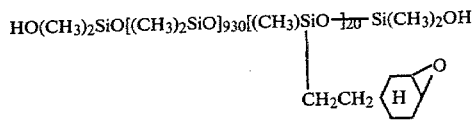

20 parts of a $\alpha$-($\beta$-aminoethylamino) propyltrimethoxysilane, 20 parts of isopropyl alcohol, 80 parts of a methyl ethyl ketone, and 100 parts toluene was prepared, applied to the surface of EPDM rubber, and heat treated for 5 minutes at 150° C. after volatilizing the solvent, a strong coating was obtained on the surface of the rubber. Results of the comparision of the abrasion resistance between this coating and an untreated surface are shown in Table 2. The conditions of the test were that a stainless steel rod with a diameter of 5 mm was pushed in to a depth of 5 mm and moved back and forth over a 10 cm distance at the rate of 30 times/min. to observe the number of times it moved back and forth before cracking occurred.

TABLE II

| | Treated surface | Untreated surface |
|---|---|---|
| Number of times moved back & forth before cracking occurred (times) | over 5,000 | 1,000 |

EXAMPLE 6

When a surface treatment agent obtained by uniformly mixing 100 parts of a polyorganosiloxane of the average formula

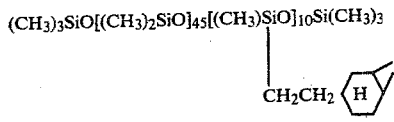

with 30 parts of a polysiloxane containing the amino group, which was obtained through the equilibrium reaction of $\gamma$-aminopropyltriethoxysilane and octamethylcyclotetrasiloxane, and have an average formula

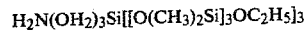

was applied to the surface of laminar ABS resin with a knife coater and heated for 1 minute at 80° C., it yielded a strong, non-tacky coating. This coating could not be peeled off or be scraped easily by the fingernails.

EXAMPLE 7

When 100 parts of a polyorganosiloxane of the average formula

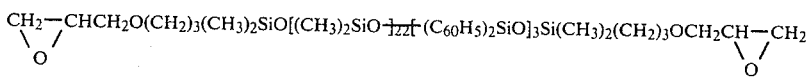

and 10 parts of a γ-(methylamino) propyltrimethoxysilane were mixed, the mixture was a little turbid at first, but a transparent and uniform liquid product was obtained when it was heated for 2 hours at 100° C.

When this was applied to the surface of SBR and heat treated for 2 minutes at 170° C., a non-tacky coating with good adhesion to the SBR was obtained.

EXAMPLE 8

By dissolving 100 parts of a polyorganosiloxane of the average formula

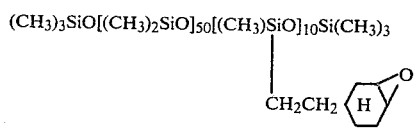

and 8 parts of a γ-aminopropyl (methyl) diethoxysilane in 108 parts xylene and heating this for 3 hours under the reflux of the xylene, a part of the epoxy group was made to react with the amino group. After cooling, 54 parts of toluene were added to make a surface treatment agent. When this surface treatment agent was applied to glassine paper and heat treated for 15 seconds at 170° C. after removing the solvent, a non-tacky coating was obtained. This coating did not peel off or become turbid when it was rubbed.

EXAMPLE 9

An experiment similar to Example 1 was conducted, the only difference being that 5 parts of

were used instead of the γ-aminopropyltriethoxysilane. The result was a strong coating that adhered to the chloroprene surface.

We claim:

1. An abrasion resistant non-adherent silicone coating composition consisting essentially of a silicone mixture selected from the class consisting of (A) a mixture of (1) a polyorganosiloxane of the general formula

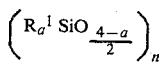

wherein $R^1$ denotes a monovalent hydrocarbon radical selected from a hydrogen atom and a monovalent hydrocarbon radical which is substituted such that of all the $R^1$'s in a single molecule, at least 2 are monovalent hydrocarbon radicals that have been substituted by a group selected from glycydoxy and epoxycyclohexyl groups wherein the letter a is a number between 1 and 3, and n denotes a number of from 10 to 5,000, and (2) an amino silicon compound in which there is a substituted or non-substituted amino group which is bonded by at least 1 carbon atom to the silicon atom of a silane or siloxane which has an alkoxy radical bonded to the silicon atom such that the number of amino groups in (2) for each glycidoxy or epoxycyclohexyl group in (1) will vary from 0.1 to 10; (B) a mixture of the reaction product of the polyorganosiloxane (1) and the silane or siloxane (2); and mixtures of (A) and (B).

2. The composition of claim 1 wherein $R^1$ consists of methyl group and hydrocarbon groups substituted by epoxy-containing radicals selected from a group composed of glycydoxy radical and epoxycyclohexyl radical.

3. The composition of claim 1 where the amine functional silane is gammaminopropyltriethoxy silane.

4. The composition of claim 1 wherein n varies from 50 to 1,000.

5. The composition of claim 1 where there is additionally present a hydrocarbon solvent which dissolves the foregoing siloxanes in solution.

6. The composition of claim 1 further comprising the presence of an emulsifying agent and water so as to emulsify the silicone mixture of ingredients in water.

7. A process for forming an abrasion resistant non-adherent silicone composition comprising the steps of mixing (A) a mixture of (1) a polyorganosiloxane of the general formula

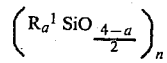

wherein $R^1$ denotes a monovalent hydrocarbon radical selected from a hydrogen atom and a monovalent hydrocarbon radical which is substituted such that of all the $R^1$'s in a single molecule, at least 2 are monovalent hydrocarbon radicals that have been substituted by a group selected from glycydoxy and epoxycyclohexyl groups wherein the letter a is a number between 1 and 3, and n denotes a number of from 10 to 5,000, and (2) an amine silicon compound in which there is a substituted or non-substituted amino group which is bonded by at least 1 carbon atom to the silicon atom of a silane or siloxane which has an alkoxy radical bonded to the silicon atom such that the number of amino groups in (2 ) for each glycydoxy or epoxycyclohexyl group in (1 ) will vary between 0.1 to 10; (B) a mixture of the reaction product of the polyorganosiloxane (1) and the silane or siloxane (2); and mixtures of (A) and (B).

8. The process of claim 7 where $R^1$ is selected from a mixture of methyl, glycydoxy radicals and epoxycyclohexyl radicals.

9. The process of claim 7 wherein the amino functional silane is gammaminopropyltriethoxy silane.

10. The process of claim 7 where n varies from 50 to 1,000.

11. The process of claim 7 further comprising dissolving the ingredients in a hydrocarbon solvent.

12. The process of claim 7 further comprising emulsifying the ingredients in water by utilizing water and emulsifying agents.

13. A process for forming an abrasion resistant non-adherent silicone coating with a good water resistance and good adherence to various substrates which is non-tacky comprising (i) applying to the substrate a silicone mixture selected from the class consisting of (A) a mixture of (1) a polyorganosiloxane of the general formula

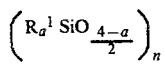

wherein R denotes a monovalent hydrocarbon radical selected from a hydrogen atom and a monovalent hydrocarbon radical which is substituted such that of all the $R^1$ radicals in a single molecule, at least 2 are monovalent hydrocarbon radicals that have been substituted by a group selected from glycydoxy or epoxycyclohexyl groups wherein the letter a is a number between 1 and 3, and n denotes a number of from 10 to 5,000, and (2) an amino silicon compound in which there is substituted or non-substituted amino group which is bonded by at least 1 carbon atom to the silicon atom of a silane or siloxane which has an alkoxy radical bonded to the silicon atom such that the number of amino groups in (2) for each glycydoxy or epoxycyclohexyl radical in (1) will vary between 0.1 to 10; and (B) a mixture of the reaction product of the polyorganosiloxane (1) and the silane or siloxane (2), and mixtures of (A) and (B); and (ii) allowing the composition to cure on the substrate.

14. The process of claim 13 where $R^1$ consist of methyl group and hydrocarbon groups substituted by epoxy-containing radicals selected from a group composed of glycydoxy radical and epoxycyclohexyl radical.

15. The process of claim 13 where n varies from 50 to 1,000.

16. The process of claim 13 wherein the amino silicone compound is gammaminopropyltriethoxy silane.

17. The process of claim 13 wherein the silicone ingredients are dissolved in a hydrocarbon solvent selected from the class consisting of toluene, xylene, cyclohexane and cycloheptane.

18. The process of claim 13 wherein the silicone ingredients are emulsified with an emulsifying agent in water.

19. The process of claim 13 where the composition is allowed to cure at room temperature.

20. The process of claim 13 wherein the composition is allowed to cure at elevated temperatures.

21. The process of claim 13 wherein the substrate is selected from the class consisting of plastics, paper and rubber.

* * * * *